United States Patent
Blackburn et al.

[19]

[11] Patent Number: 5,890,779
[45] Date of Patent: Apr. 6, 1999

[54] APPARATUS FOR PROVIDING ELECTRICAL COMMUNICATION BETWEEN PARTS OF A VEHICLE

[75] Inventors: Brian K. Blackburn, Rochester; Scott B. Gentry, Romeo; Joseph F. Mazur, Washington; John B. Sparhawk, Royal Oak, all of Mich.

[73] Assignee: TRW Vehicle Safety Systems Inc., Lyndhurst, Ohio

[21] Appl. No.: 831,547

[22] Filed: Apr. 8, 1997

[51] Int. Cl.[6] .................................................. H01F 27/00
[52] U.S. Cl. .......................................... 307/10.1; 307/104
[58] Field of Search .............................. 307/104, 17, 9.1, 307/10.1, 10.6, 10.7, 10.8; 701/1, 36, 45, 49; 336/DIG. 2; 455/41; 439/950; 340/310.01, 310.08, 310.07, 854.8, 825.69, 825.73

[56] References Cited

U.S. PATENT DOCUMENTS

| | | |
|---|---|---|
| 4,038,625 | 7/1977 | Tompkins et al. ................. 336/DIG. 2 |
| 4,550,444 | 10/1985 | Uebel ....................................... 455/41 |
| 4,639,714 | 1/1987 | Crowe ................................. 340/310 A |
| 4,700,974 | 10/1987 | Andres et al. . |
| 4,888,535 | 12/1989 | Brusasco ................................ 307/10.1 |
| 4,918,745 | 4/1990 | Hutchison ................................ 455/41 |
| 4,977,623 | 12/1990 | DeMarco . |
| 5,229,652 | 7/1993 | Hough ...................................... 307/104 |
| 5,385,476 | 1/1995 | Jasper ................................ 336/DIG. 2 |
| 5,422,519 | 6/1995 | Russell ................................... 307/104 |
| 5,455,467 | 10/1995 | Young et al. ........................... 307/104 |
| 5,568,939 | 10/1996 | Blackburn et al. . |
| 5,571,253 | 11/1996 | Blackburn et al. ..................... 180/282 |
| 5,696,409 | 12/1997 | Handman et al. ..................... 307/10.1 |

OTHER PUBLICATIONS

SAE Paper on charging electric retractor.

*Primary Examiner*—Richard T. Elms
*Attorney, Agent, or Firm*—Tarolli, Sundheim, Covell, Tummino &Szabo

[57] ABSTRACT

An apparatus (10) for use in a vehicle (14) comprises at least one control device (140) carried by the vehicle (14), a vehicle seat (12) and at least one electrical device (180) carried by the vehicle seat (12). A latching mechanism (60) is provided for mounting the vehicle seat (12) to the vehicle (14). A first antenna, such as a pair of coils (110, 150) transmits an electrical power signal from a power source (118) on the vehicle (14) to at least one electrical device (180) carried by the vehicle seat (12). A second antenna such as a pair of antennas (120, 160) transmits communication signals between the electrical device (180) carried by the vehicle seat (12) and the control device (140) carried by the vehicle (14).

27 Claims, 3 Drawing Sheets

APPARATUS FOR PROVIDING ELECTRICAL COMMUNICATION BETWEEN PARTS OF A VEHICLE

TECHNICAL FIELD

The present invention is directed to an apparatus for providing electrical communication between parts of a vehicle, and is particularly directed to an apparatus which provides electrical communication between an electrical device on a vehicle seat and a control device on the vehicle.

BACKGROUND OF THE INVENTION

Vehicles often have an electrical device mounted on or in a seat of the vehicle. Examples of such an electrical device include seat-mounted stereo controls, seat-mounted temperature controls, a seat-mounted air bag, a seat position motor, and a seat heater. Each of these electrical devices may have an associated control device located elsewhere on the vehicle. Accordingly, it is necessary to provide electrical communication between each electrical device on the vehicle seat and its respective control device on the vehicle. Further, it is necessary to provide electrical communication between each electrical device on the seat and a source of electrical power on the vehicle to energize the electrical device.

It is known in the art to make a hard-wired electrical plug-in connection between an electrical device mounted on or in the vehicle seat and a control device mounted elsewhere in the vehicle. Certain vehicle seats, such as van seats, are removable from the vehicle. The plug-in connection makes removal and replacement of the vehicle seat somewhat cumbersome since the electrical connection must be manually disconnected for seat removal and reconnected for seat installation. Consequently, an apparatus which employs non-contacting means for providing electrical communication, in the form of control signals and electrical power, between a seat mounted electrical device and a control device mounted elsewhere in the vehicle when the seat is installed in the vehicle is desirable. Such non-contacting means would not require manual connection or disconnection of wires during installation or removal of the seat, respectively.

SUMMARY OF THE INVENTION

An apparatus for use in a vehicle comprises at least one control device carried by the vehicle, a vehicle seat, and at least one electrical device carried by the vehicle seat. A means is provided for mounting the vehicle seat to the vehicle. First antenna means is provided for transmitting an electrical power signal from a power source on the vehicle to the at least one electrical device carried by the vehicle seat. Second antenna means is provided for transmitting communication signals between the at least one electrical device carried by the vehicle seat and the at least one control device carried by the vehicle.

In accordance with a preferred embodiment of the invention, the first antenna means comprises a power transmitting coil mounted to the vehicle and a power receiving coil mounted to the vehicle seat. The second antenna means comprises a first antenna mounted to the vehicle and a second antenna mounted to the vehicle seat. The means for mounting the vehicle seat to the vehicle permits the vehicle seat to be removably mounted.

In accordance with one feature of the invention, an energy storage means is mounted to the vehicle seat for storing electrical energy from the electrical power signal transmitted by the first antenna means. A converting and charging circuit is operatively connected between the first antenna means and the energy storage means. The electrical power signal is an alternating current which the converting and charging circuit converts into a direct current. The converting and charging circuit charges the energy storage means with the direct current. The at least one electrical device is electrically connected to the energy storage means.

In accordance with another feature of the invention, first control means is provided for digitally encoding the communication signals and second control means is provided for digitally decoding the communication signals. The first control means is electrically connected between the second antenna means and one of the at least one electrical device and the at least one control device. The second control means is electrically connected between the second antenna and the other of the at least one electrical device and the at least one control device. Each of the first and second control means comprises a microcomputer.

In further accordance with the present invention, an apparatus is provided for use in a vehicle comprising first control means carried by a first part of the vehicle for providing a control signal and second control means carried by a second part of the vehicle for providing the control signal to a device on the second part of the vehicle. Non-contact transceiver means is connected to the first control means and to the second control means for coupling the control signal from the first control means to the second control means. Non-contact power transmission means is provided for generating an electromagnetic field to induce electrical power in the second control means.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
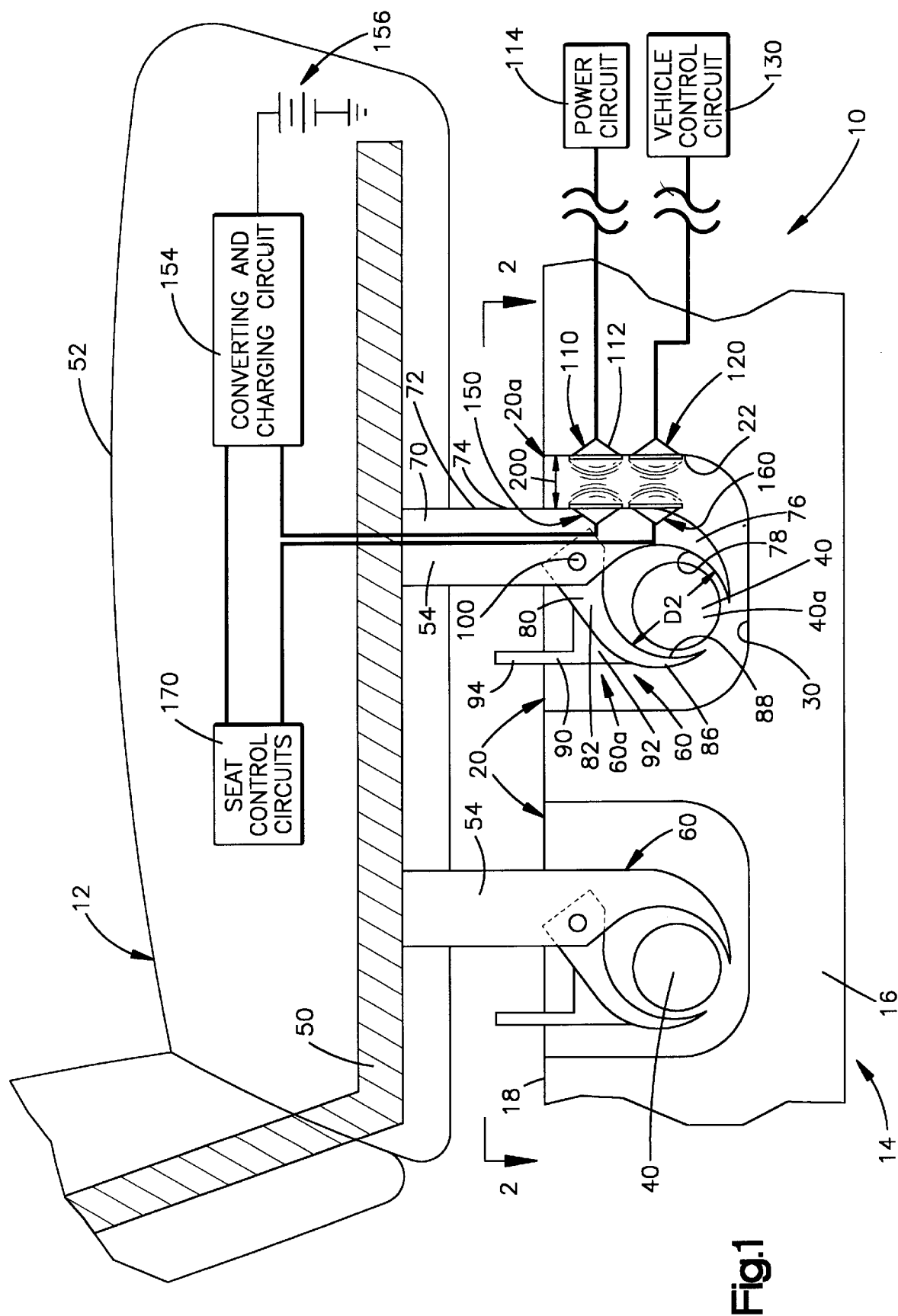
FIG. 1 is a schematic diagram of a remote power and data communication arrangement, in accordance with the present invention, for use in a vehicle seat.
Figure 2:
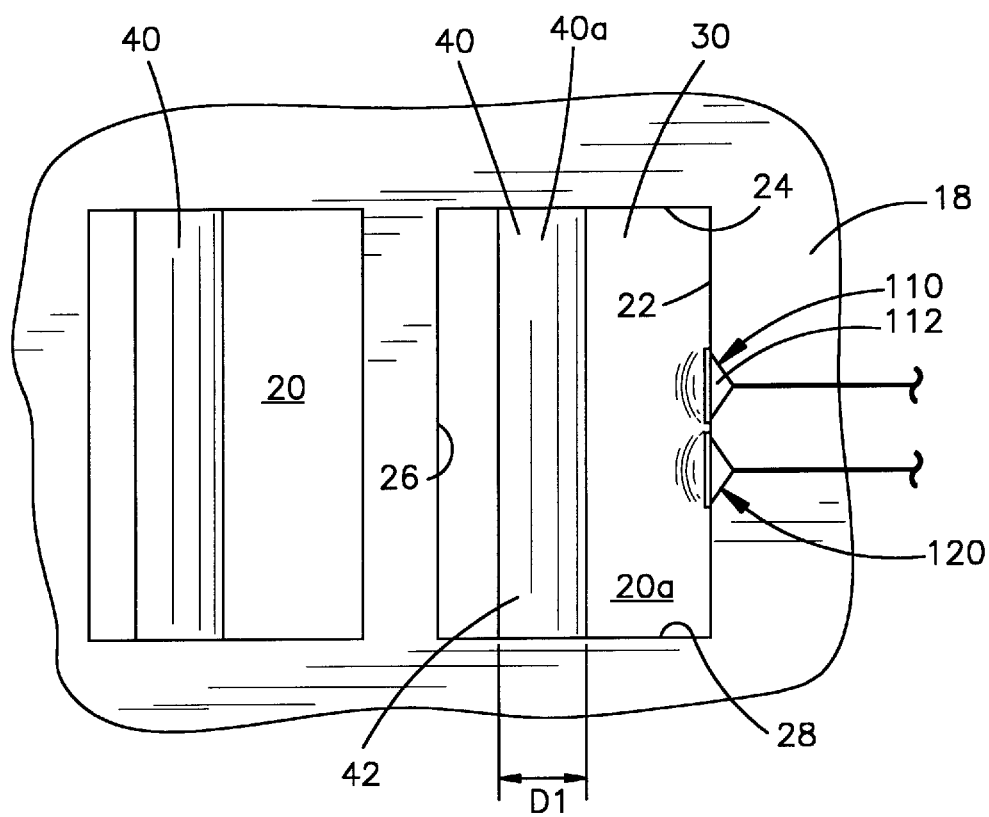
FIG. 2 is a view taken along line 2—2 in FIG. 1 with parts removed for clarity.

Referring to FIG. 1, an apparatus 10 for supplying electrical power and control signals between an electrical device mounted on or in a vehicle seat 12 and a vehicle 14 is shown. The vehicle 14 includes a vehicle body 16 having a floor 18 which is substantially planar. The floor 18 includes a plurality of channels 20, two of which are shown in FIGS. 1 and 2. The channels 20 extend downward from the floor 18 and are generally rectangular in shape. A first one, denoted as channel 20a, of the plurality of channels 20 has a first side portion 22, a second side portion 24, a third side portion 26, and a fourth side portion 28, as best seen in FIG. 2. The first side portion 22 is parallel to the third side portion 26 and the second side portion 24 is parallel to the fourth side portion 28. The first channel 20a also has a bottom wall 30 which is substantially parallel with the floor 18 of the vehicle body 16.

An identical bar member 40 is disposed in each of the plurality of channels 20 as shown in FIGS. 1 and 2. In the first channel 20a, a first one, denoted as bar member 40a, of the identical bar members 40 extends across the length of the first channel 20a and is fixed to the second and fourth side portions 24 and 28 as shown in FIG. 2. The first bar member 40a extends substantially parallel to the first side portion 22 of the first channel 20a. The first bar member 40a is cylindrical in shape and includes an outer surface 42 having a diameter D1.

Referring again to FIG. 1, the vehicle seat 12 includes a frame 50 and a seat cushion 52 attached to the frame 50. The vehicle seat 12 further includes a plurality of mounting feet 54 which extend in a downward direction from the frame 50. Each of the mounting feet 54 has a latch mechanism 60. A first one, denoted as latch mechanism 60a, of the latch mechanisms 60 includes a first member 70 which is stationary, a second member 80 which is pivotable with respect to the first member 70, and a manually actuatable lever 90 fixedly attached to the second member 80. The first member 70 of the first latch mechanism 60a includes an upper portion 72 and a lower portion 76. The upper portion 72 is rectangular in shape and has a outside surface 74. The lower portion 76 is curved and has an inside surface 78. A pivot pin 100 is mounted to the lower portion 76.

The pivotable second member 80 includes an upper section 82 and a lower section 86. The upper section 82 of the second member 80 is mounted on the pivot pin 100. A spring (not shown) biases the second member 80 to rotate in a counterclockwise direction as shown in FIG. 1. The lower section 86 of the second member 80 is curved, but in an opposite direction from the curvature of the lower portion 76 of the first member 70. The lower section 86 has an inside surface 88. The inside surfaces 78 and 88 of the first member 70 and the second member 80, respectively, together define an inner diameter D2 for the first latching mechanism 60a which is slightly greater than the outer diameter D1 of the bar member 40a.

The manually actuatable lever 90 includes a connecting portion 92 and a manually engagable portion 94. The connecting portion 92 is fixedly connected to the upper section 82 of the second member 80 of the first latching mechanism 60a. The manually engagable portion 94 is located in a manually engagable location underneath the vehicle seat 12.

Figure 3:
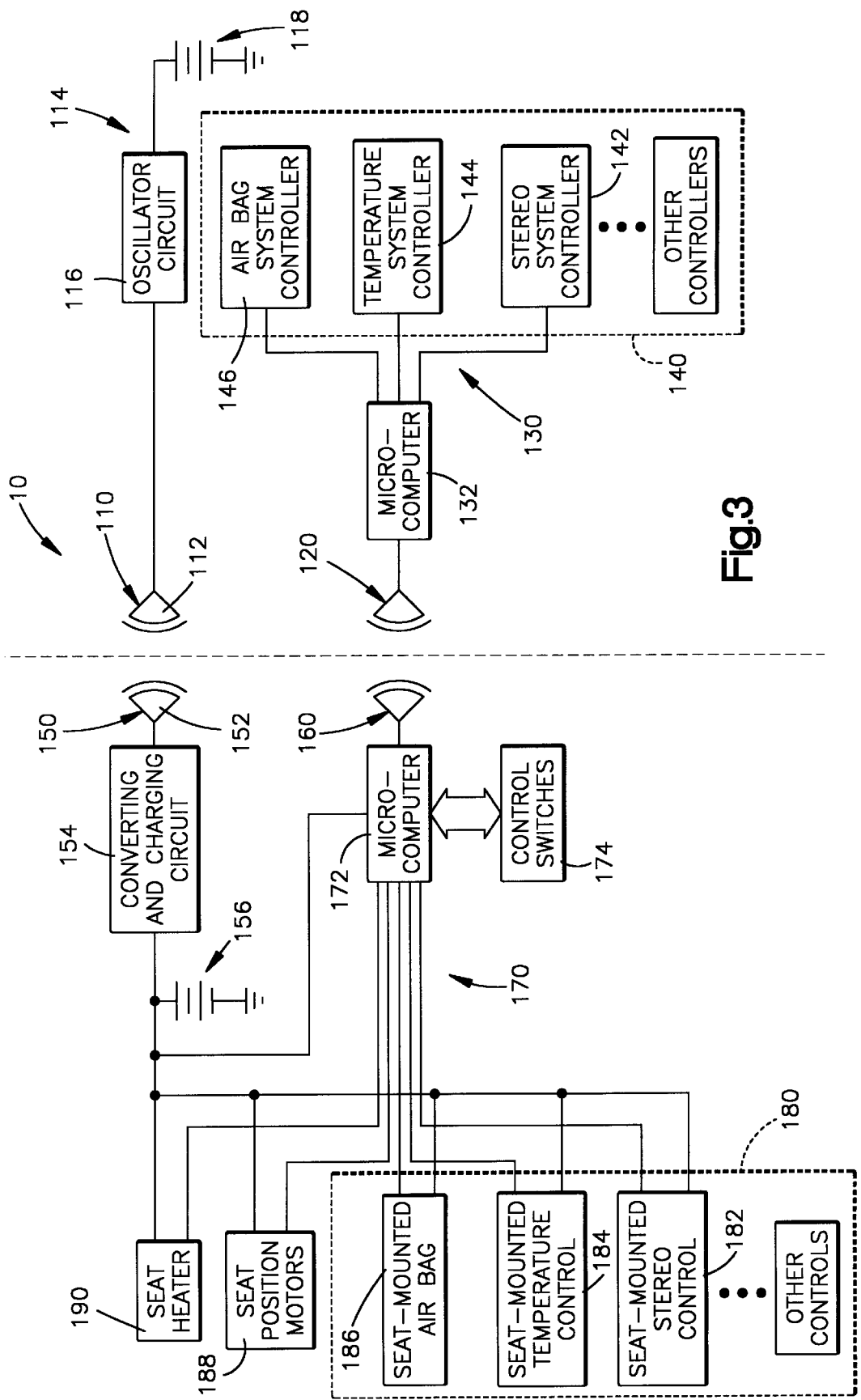
FIG. 3 is a schematic circuit diagram of the remote power and data communication arrangement of FIG. 1.

A power transmitting antenna 110 is disposed in the first channel 40a as shown in FIG. 1. The power transmitting antenna 110 comprises a power transmitting coil 112 which is attached to the first side portion 22 of the first channel 20a. The power transmitting coil 112 is electrically connected to a power circuit 114. Referring to FIG. 3, the power circuit 114 includes an oscillator circuit 116 which is mounted to the vehicle body 16 and is connected to a source of electrical power 118 in the vehicle 14, such as the vehicle's battery.

A first signal antenna 120 is also disposed in the first channel 20a. The first signal antenna 120 is attached to the first side portion 22 of the first channel 20a adjacent the power transmitting coil 112. The first signal antenna 120 is electrically connected to a vehicle control circuit 130. As shown in detail in FIG. 3, the vehicle control circuit 130 includes a first microcomputer 132 which is mounted to the vehicle body 16. The first microcomputer 132 is operatively coupled to a plurality of electrical controllers 140 located in the vehicle 14.

The plurality of electrical controllers 140 includes a stereo system controller 142, a temperature system controller 144, and an air bag system controller 146. The stereo system controller 142 is typically mounted in the dashboard or instrument panel (not shown) of the vehicle 14, as is the temperature system controller 144. The air bag system controller 146 may be mounted to the vehicle body 16 in a variety of locations.

A second power antenna 150 comprising a power receiving coil 152 is attached to the first outside surface 74 of the first member 70 of the first latch mechanism 60a. The second power antenna 150 is positioned so that when the seat 12 is installed in the vehicle 14 as shown in FIG. 1, the power transmitting and power receiving coils 112 and 152 are in close proximity with each other, with a relatively small gap therebetween. The power receiving coil 152 is electrically connected to a converting and charging circuit 154. An energy storage device, such as a battery 156, is located in the vehicle seat 12 and electrically connected to the converting and charging circuit 154 as shown in FIGS. 1 and 3.

A second signal antenna 160 is attached to the first outside surface 74 of the first member 70 of the first latch mechanism 60a. The second signal antenna 160 is positioned so as to be in close proximity with the first signal antenna 120 when the seat 12 is installed with a relatively small gap between the antennas 120 and 160. The second signal antenna 160 is electrically connected to a seat control circuit 170. As shown in detail in FIG. 3, the seat control circuit 170 includes a second microcomputer 172 which is located in the vehicle seat 12. The second microcomputer 172 is operatively coupled to a plurality of electrical devices 180 located in the vehicle seat 12. The second microcomputer 172 is also operatively coupled to the battery 156 in the vehicle seat 12. A plurality of control switches 174, such as seat position control switches, are connected to the second microcomputer 172 as shown in FIG. 3.

The plurality of electrical devices 180, located in the vehicle seat 12, includes a stereo control 182, temperature control 184, an air bag 186, seat position motors 188, and a seat heater 190. The plurality of electrical devices 180 are electrically connected to the battery 156 in the vehicle seat 12.

To install the vehicle seat 12 in the vehicle 14, the mounting feet 54 of the vehicle seat 12 are positioned just above the plurality of channels 20 in the floor 18 of the vehicle body 16. The installation procedure which is described below for the first latching mechanism 60a is used for each of the latching mechanisms 60 on the plurality of mounting feet 54. The actuatable lever 90 is manually pivoted (clockwise in FIG. 1), which causes the second member 80 of the first latching mechanism 60a to pivot along with it. An opening is created between a terminal end of the lower section 86 of the second member 80 and a terminal end of the lower portion 76 of the first member 70, respectively. The vehicle seat 12 is then manually lowered such that the first bar member 40a is received through the opening in the first latching mechanism 60a. The actuatable lever 90 is then released and the spring (not shown) causes the second member 80 to pivot counterclockwise, closing the opening and thereby capturing the first bar member 40a in the first latching mechanism 60a. The inside surfaces 78 and 88 of the first latching mechanism 60a fit tightly around the outer surface 42 of the first bar member 40a to secure the vehicle seat 12 to the vehicle body 16.

When the above installation procedure is completed for each of the mounting feet 54 of the vehicle seat 12, the vehicle seat 12 has been placed into a predetermined position in the vehicle 14. With the vehicle seat 12 in the predetermined position, a gap 200 is formed between the outside surface 74 of the first member 70 of the first latch mechanism 60a and the first side portion 22 of the first channel 20a. The power transmitting coil 112 directly opposes, but does not contact, the power receiving coil 152 across the gap 200 and is in close proximity therewith. Similarly, the first signal antenna 120 directly opposes, but does not contact, the second signal antenna 160 across the gap 200 and is in close proximity therewith. When the vehicle seat 12 is in the predetermined position and the vehicle's electrical system is activated (i.e., the ignition is turned on), the apparatus 10 is operable to provide simultaneously (i) electrical power to the converting and charging circuit 154 in the vehicle seat 12, and (ii) electrical communication of control signals to and from the plurality of electrical devices 180 in the vehicle seat 12, without the use of electrical plug-in style (i.e., contacting) connections between the vehicle seat 12 and the vehicle 14.

The apparatus 10 provides electrical power to the vehicle seat 12 without using an electrical plug-in connection by transmitting electrical energy from the power transmitting coil 112 on the vehicle body 16 to the power receiving coil 152 on the vehicle seat 12. The oscillator circuit 116 in the power circuit 114 converts a DC voltage from the vehicle's battery 118 into an AC electrical signal. The AC signal is provided to the transmitting coil 112 where it generates an electromagnetic field. The electromagnetic field transmits across the gap 200 and induces electrical energy in the power receiving coil 152. Electrical energy induced in the power receiving coil 152 is passed to the converting and charging circuit 154 where it is converted into a DC signal and used to charge the battery 156 located in the vehicle seat 12.

The apparatus 10 also permits communication of controls signals to and from the plurality of electrical devices 180 without using an electrical plug-in connection. The first and second signal antennas 120 and 160 function as transceivers which are capable of sending and receiving control signals between the microcomputers 132 and 172. To send a control signal to the vehicle seat 12, e.g., a signal to trigger the air bag 186 mounted in the vehicle seat 12, a trigger control signal is sent from the air bag system controller 146 in the vehicle to the microcomputer 132. The trigger control signal is digitally encoded by the microcomputer 132, transmitted from signal antenna 120, received by signal antenna 160, and communicated to the microcomputer 172 on the vehicle seat 12. The microcomputer 172 decodes the trigger control signal and sends the trigger control signal to the appropriate electrical device, which in this instance is the air bag 186. As may been seen in FIG. 3, the air bag 186 is also connected to the battery 156 on the vehicle seat 12 so that any electrical power required to carryout the directions of the control signal may be obtained from the battery 156. Those skilled in the art will appreciate that the air bag 186 includes appropriate drive circuity connected between the battery 156 and an igniter for the air bag 186.

To send a signal from an electrical device in the seat 12, such as the air bag 186, back to a vehicle system controller, such as the air bag system controller 146, a signal is sent from the microcomputer 172 to the microcomputer 132 through the signal antennas 160 and 120, respectively. For example, the microcomputer 172 may perform a diagnostic test on the air bag 186. It is desirable to report the results of this diagnostic test to the system controller 146. The diagnostic test result is digitally encoded by the microcomputer 172 and transmitted from the signal antenna 160 and received by the signal antenna 120. The received signal is then provided to microcomputer 132 in the vehicle 14. The microcomputer 132 decodes the diagnostic test result signal and sends the signal to the appropriate controller, which in this case is the air bag system controller 146. The air bag system controller 146 can then illuminate a light on the vehicle's instrument panel, for example, to alert the driver of the status of the air bag 186.

Because the first and second signal antennas 120 and 160 operate as transceivers, that is, the antennas both transmit and receive signals, the first and second microcomputers 132 and 172 are programmed to operate in half-duplex mode so that communication occurs in only one direction at a time.

Control signals from the other controllers in the vehicle 14 shown in FIG. 3 are encoded, transmitted, decoded, and sent to the appropriate electrical device in the vehicle seat 12 in the same manner as is described above. Further, control signals (and/or diagnostic signals) from the other devices 180 in the vehicle seat 12 shown in FIG. 3 are encoded, transmitted, decoded, and sent to the appropriate controller in the vehicle 14 in the same manner as described above. For example, the seat-mounted stereo control 182 can send a signal back to the stereo system controller 142 to adjust the volume level of the vehicle's stereo system. Similarly, the seat-mounted temperature control 184 can send a signal back to the temperature system controller 144 to adjust the temperature inside the vehicle 14.

The apparatus 10 enables the plurality of electrical devices 180 to be energized without using a plug-in connection between the vehicle seat 12 and the vehicle 14. As shown in FIG. 3, the seat position motor 188 and seat heater 190 are electrically connected to the battery 156 in the vehicle seat 12 which is charged by the power coils 112 and 152.

From the above description of the invention, those skilled in the art will perceive improvements, changes and modifications. For example, other electrical devices could be located in the vehicle seat and operated by the apparatus 10 including an electrical seat belt retractor, a lighted seat belt buckle, a belt pretensioner, an occupant position or weight sensor, a seat-mounted massager, and interior lighting controls. Further, the signal antennas could be located in a different channel in the vehicle floor than the power transmitting and power receiving coils. Finally, the vehicle seat could be secured to the vehicle using a different latching mechanism than the latching mechanism 60 described herein. Such improvements, changes and modifications within the skill of the art are intended to be covered by the appended claims.

Having described the invention, the following is claimed:

1. An apparatus for use in a vehicle, said apparatus comprising:

at least one control device carried by the vehicle;

a vehicle seat;

at least one electrical device carried by said vehicle seat;

means for mounting said vehicle seat to the vehicle;

first antenna means for transmitting an electrical power signal from a power source on the vehicle to said at least one electrical device carried by said vehicle seat; and second antenna means separate from said first antenna means for transmitting communication signals between said at least one electrical device carried by said vehicle seat and said at least one control device carried by the vehicle.

2. The apparatus of claim 1 wherein said first antenna means comprises a power transmitting coil mounted to the vehicle and a power receiving coil mounted to said vehicle seat.

3. The apparatus of claim 1 wherein said second antenna means comprises a first antenna mounted to the vehicle and a second antenna mounted to said vehicle seat.

4. The apparatus of claim 1 wherein said means for mounting said vehicle seat to the vehicle permits said vehicle seat to be removably mounted to the vehicle.

5. The apparatus of claim 1 wherein said means for mounting said vehicle seat to the vehicle comprises cooperating parts of said vehicle seat and the vehicle which latch the vehicle and said vehicle seat together when said vehicle seat is positioned in a predetermined position relative to the vehicle.

6. The apparatus of claim 1 further comprising first control means for digitally encoding said communication signals and second control means for digitally decoding the digitally encoded communication signals from the first control means, said first control means being electrically connected between said second antenna means and said at least one control device, and said second control means being electrically connected between said second antenna means and said at least one electrical device.

7. The apparatus of claim 6 wherein said second control means is operable to digitally encode the communication signals and said first control means is operable to digitally decode the digitally encoded communication signals from the second control means, thereby providing bidirectional communication through said second antenna means.

8. The apparatus of claim 7 wherein each of said first and second control means comprise a microcomputer.

9. An apparatus for use in a vehicle, said apparatus comprising:
   at least one control device carried by the vehicle;
   a vehicle seat;
   at least one electrical device carried by said vehicle seat;
   means for removably mounting said vehicle seat to the vehicle, said means for mounting said vehicle seat further including a floor section located in the vehicle which has at least one channel, said at least one channel having a first side portion and a bar member, said bar member being disposed in said at least one channel and extending parallel to said first side portion of said at least one channel;
   first antenna means for transmitting an electrical power signal from a power source on the vehicle to said at least one electrical device carried by said vehicle seat; and
   second antenna means for transmitting communication signals between said at least one electrical device carried by said vehicle seat and said at least one control device carried by the vehicle.

10. The apparatus of claim 9 wherein said means for mounting said vehicle seat further includes at least one latch mechanism extending from said vehicle seat for engaging said bar member in said at least one channel.

11. The apparatus of claim 10 wherein said power transmitting coil and said first antenna are mounted to said first side portion of said at least one channel, and wherein said power receiving coil and said second antenna are mounted to said at least one latch mechanism, said transmitting coil directly opposing said receiving coil and said first antenna directly opposing said second antenna when said at least one latch mechanism is engaged with said bar member in said at least one channel.

12. An apparatus for use in a vehicle, said apparatus comprising:
   at least one control device carried by the vehicle;
   a vehicle seat;
   at least one electrical device carried by said vehicle seat;
   means for mounting said vehicle seat to the vehicle;
   first antenna means for transmitting an electrical power signal from a power source on the vehicle to said at least one electrical device carried by said vehicle seat;
   second antenna means for transmitting communication signals between said at least one electrical device carried by said vehicle seat and said at least one control device carried by the vehicle; and
   energy storage means mounted to said vehicle seat for storing electrical energy from the electrical power signal transmitted by said first antenna means.

13. The apparatus of claim 12 further comprising a converting and charging circuit operatively connected between said first antenna means and said energy storage means, said electrical power signal being an alternating current, said converting and charging circuit converting said alternating current into a direct current and charging said energy storage means with said direct current.

14. The apparatus of claim 12 wherein said at least one electrical device is electrically connected to said energy storage means.

15. An apparatus for use in a vehicle, said apparatus comprising:
   first control means carried by a first part of the vehicle for providing a control signal;
   second control means carried by a second part of the vehicle for providing the control signal to a device on said second part of the vehicle;
   non-contact transceiver means connected to said first control means and to said second control means for communicating said control signal from said first control means to said second control means; and
   non-contact power transmission means separate from said non-contact transceiver means for generating an electromagnetic field to provide electrical power to said second control means.

16. The apparatus of claim 15 wherein said non-contact transceiver means includes a pair of spaced apart antennas, one of said pair of antennas being mounted to said first part of the vehicle and the other of said pair of antennas being mounted to said second part of the vehicle.

17. The apparatus of claim 15 wherein said non-contact power transmission means includes a pair of spaced apart coils, one of said pair of coils being mounted to said first part of the vehicle and the other of said pair of coil being mounted to said second part of the vehicle.

18. The apparatus of claim 15 wherein said first control means includes means for digitally encoding said control signal and said second control means includes means for digitally decoding said control signal.

19. The apparatus of claim 15 wherein each of said first and second control means comprise a microcomputer.

20. The apparatus of claim 15 further comprising circuit converting means for converting said electrical power provided by said non-contact power transmission means from alternating current to direct current, said circuit converting means being carried by one of said first and second parts of the vehicle and connected to said non-contact power transmission means.

21. The apparatus of claim 15 wherein said first part of the vehicle comprises a removable vehicle seat.

22. An apparatus for use in a vehicle, said apparatus comprising:
   first control means carried by a first part of the vehicle for providing a control signal;

second control means carried by a second part of the vehicle for providing said control signal to a device on said second part of the vehicle;

non-contact transceiver means connected to said first control means and to said second control means for communicating said control signal from said first control means to said second control means;

non-contact power transmission means for generating an electromagnetic field to provide electrical power to said second control means; and energy storage means for storing the electrical power provided by said non-contact power transmission means, said energy storage means being carried by one of said first and second parts of the vehicle.

23. An apparatus for use in a vehicle, said apparatus comprising:

at least one control device carried by the vehicle;

a vehicle seat;

at least one electrical device carried by said vehicle seat;

first antenna means for transmitting an electrical power signal from a power source on the vehicle to said at least one electrical device carried by said vehicle seat;

second antenna means for transmitting communication signals between said at least one electrical device carried by said vehicle seat and said at least one control device carried by the vehicle; and a mounting assembly having a bar member located in a body portion of the vehicle and a corresponding latch mechanism which extends from said vehicle seat for engaging said bar member to mount said vehicle seat in the vehicle, said first antenna means having a first part mounted adjacent said bar member and a second part mounted to said latch mechanism, said first part of said first antenna means opposing said second part of said first antenna means when said latch mechanism is engaged with said corresponding bar member to permit transmission of the electrical power signal between said first part and said second part of said first antenna means.

24. The apparatus of claim 23 wherein said second antenna means comprises a first antenna part mounted to said vehicle and a second antenna part mounted to said vehicle seat.

25. The apparatus of claim 24 wherein said first antenna part of said second antenna means is mounted to said vehicle adjacent said bar member and said second antenna part of said second antenna means is mounted to said latch mechanism such that said first antenna part of said second antenna means opposes said second antenna part of said second antenna means when said latch mechanism is engaged with said bar member to permit transmission of the communication signals between said first and second antenna parts of said second antenna means.

26. The apparatus of claim 23 wherein said mounting assembly further includes a channel formed in a floor section of the vehicle, said channel having spaced apart side portions, said bar being disposed within said channel intermediate said side portions of said channel.

27. The apparatus of claim 26 wherein said second part of said first antenna means is mounted to one of said side portions of said channel.

* * * * *